United States Patent
Yucel et al.

(10) Patent No.: US 8,407,413 B1
(45) Date of Patent: Mar. 26, 2013

(54) HARDWARE FLOW CLASSIFICATION FOR DATA STORAGE SERVICES

(75) Inventors: Sakir Yucel, Wexford, PA (US); Chatree Sangpachatanaruk, Wexford, PA (US)

(73) Assignee: NetApp, Inc, Sunnyvale, CA (US)

( * ) Notice: Subject to any disclaimer, the term of this patent is extended or adjusted under 35 U.S.C. 154(b) by 169 days.

(21) Appl. No.: 12/940,958

(22) Filed: Nov. 5, 2010

(51) Int. Cl.
*G06F 12/00* (2006.01)
(52) U.S. Cl. .......... 711/108; 709/203; 709/230
(58) Field of Classification Search .......... 711/108
See application file for complete search history.

(56) References Cited

U.S. PATENT DOCUMENTS

| | | | |
|---|---|---|---|
| 6,708,250 B2 * | 3/2004 | Gillingham | 711/108 |
| 2004/0010545 A1 * | 1/2004 | Pandya | 709/203 |
| 2004/0078516 A1 * | 4/2004 | Henderson et al. | 711/108 |

OTHER PUBLICATIONS

Taylor et ali. On using content addressable memory for packet classification. Mar. 3, 2005 [online], [retrieved on Jun. 17, 2012]. Retrieved from the Internet <URL: http://citeseerx.ist.psu.edu/viewdoc/summary?doi=10.1.1.109.4546>.*

* cited by examiner

*Primary Examiner* — Hashem Farrokh
*Assistant Examiner* — Larry MacKall
(74) *Attorney, Agent, or Firm* — Perkins Coie LLP

(57) ABSTRACT

The techniques introduced here provide a system and method for hardware implemented storage service flow classification using content addressable memory. The techniques described here allow for classification and handling of storage service requests according to service level agreement (SLA) or quality of service (QoS) parameters without consuming valuable storage server resources.

20 Claims, 10 Drawing Sheets

HARDWARE FLOW CLASSIFICATION FOR DATA STORAGE SERVICES

FIELD OF THE INVENTION

At least one embodiment of the present invention pertains to storage flow classification in network storage systems, and more particularly, to hardware implemented storage flow classification and quality of service for network based data storage services.

BACKGROUND

A storage controller is a physical processing device that is used to store and retrieve data on behalf of one or more hosts. A network storage controller can be configured (e.g., by hardware, software, firmware, or any combination thereof) to operate as a storage server that serves one or more clients on a network, to store and manage data in a set of mass storage devices, such as magnetic or optical storage-based disks, tapes, or flash memory. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif., employing the Data ONTAP® storage operating system.

Quality of service (QoS) is an important feature in networking and telecommunication systems. QoS can be defined as prioritizing data flow from different entities. For example, an application may be guaranteed a required bit rate, delay, level of jitter, packet-dropping probability and/or bit error rate by a network. A network customer and a service provider typically enter into a service level agreement (SLA) that defines the QoS provided to the customer. A network customer can be defined as an entity that uses services provided by the service provider. Flow classification is an important step in providing QoS by determining, for example, a customer that is associated with an information element, for example, a data packet or frame, being transmitted across the network. The network handles the information element based on the flow classification and the QoS agreement.

With the increased use of clustered storage server networks, cloud storage services, virtualized storage, and streaming multimedia being provided from these storage services, QoS is also becoming increasingly important in storage server systems and services to meet customer demands. However, common software-only solutions for flow classification disrupt the storage server system by adding additional processing along the path of execution. Such solutions may not be predictable enough to provide services under SLA or QoS constraints, especially in high-end storage systems. As line rates and traffic increase for storage services, this problem becomes even more acute.

SUMMARY

The techniques introduced here provide a hardware based storage flow service classification system, which can be used in a network storage system. The techniques according to one embodiment include a system and method for performing flow classification of storage service requests. Using the techniques introduced here, hardware (e.g., content addressable memory) is used to perform matching operations for flow classification of information elements, such as packets, received at a storage server. In flow classification generally, a flow can be defined as a unidirectional sequence of packets all sharing a set of attributes. Once a flow for an information element has been determined, an action can be performed on the information element according to SLA or QoS parameters.

The techniques introduced here, in one embodiment, include classifying the information element based on information contained in the information element using ternary content addressable memory (TCAM). Flow classification can include, among other things, identifying a storage service customer, identifying a storage access protocol, and identifying a target storage entity. The techniques include flow parameters and actions specific to data storage services.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
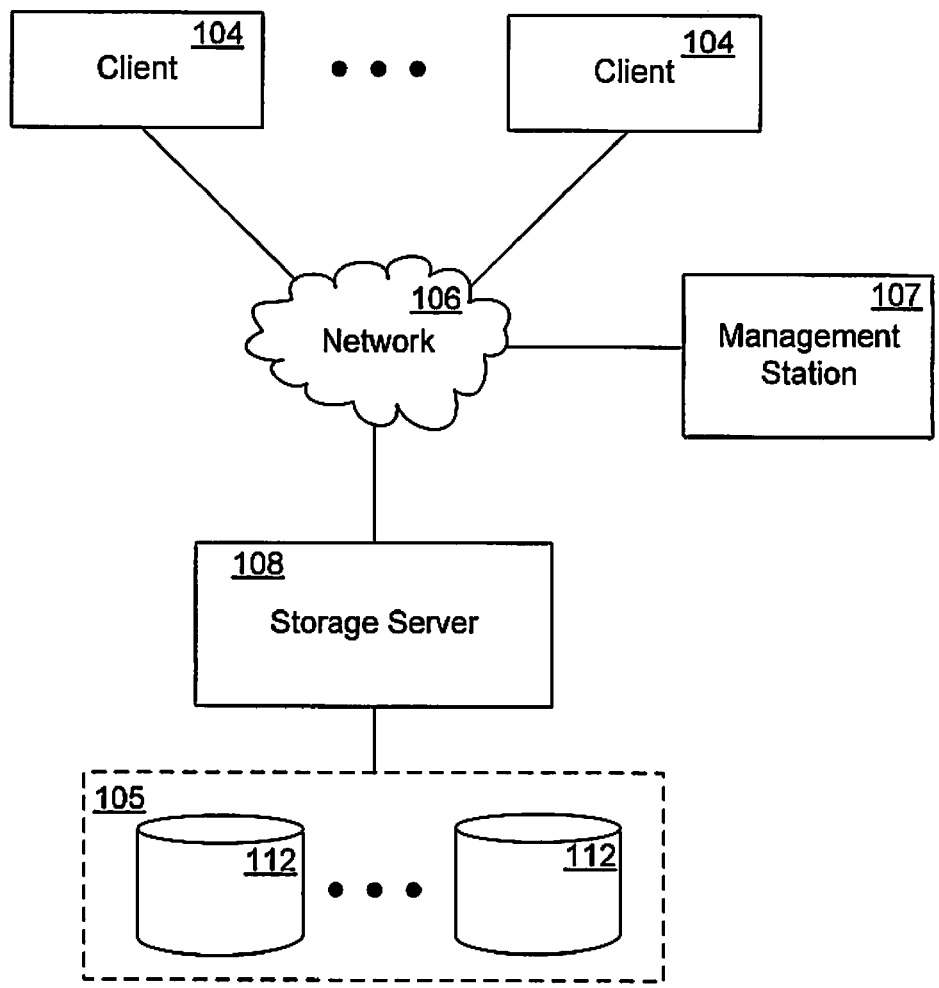
FIG. 1 shows an example of a network storage system.

FIG. 1 shows an example of a network storage system, which includes a plurality of client systems 104, a storage server 108, and a network 106 connecting the client systems 104 and the storage server 108. As shown in FIG. 1, a storage controller configured as a storage server 108 is coupled to a number of mass storage devices 112, such as disks, in a mass storage subsystem 105. Alternatively, some or all of the mass storage devices 112 can be other types of storage, such as flash memory, solid-state drives (SSDs), tape storage, etc.

However, for ease of description, the storage devices 112 are assumed to be disks herein.

The storage server 108 can be, for example, one of the FAS-series of storage server products available from NetApp®, Inc. The client systems 104 are connected to the storage server 108 via the network 106, which can be a packet-switched network, for example, a local area network (LAN) or wide area network (WAN). Further, the storage server 108 can be connected to the disks 112 via a switching fabric (not shown), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s). The storage server 108 can communicate with the client systems 104 according to well-known protocols, such as the Network File System (NFS) protocol or the Common Internet File System (CIFS) protocol, to make data stored on the disks 112 available to users and/or application programs. The storage server 108 can present or export data stored on the disks 112 as volumes, to each of the client systems 104. Various functions and configuration settings of the storage server 108 can be controlled by a user, e.g., a storage administrator, from a management station 107 coupled to the network 106.

Figure 2A:
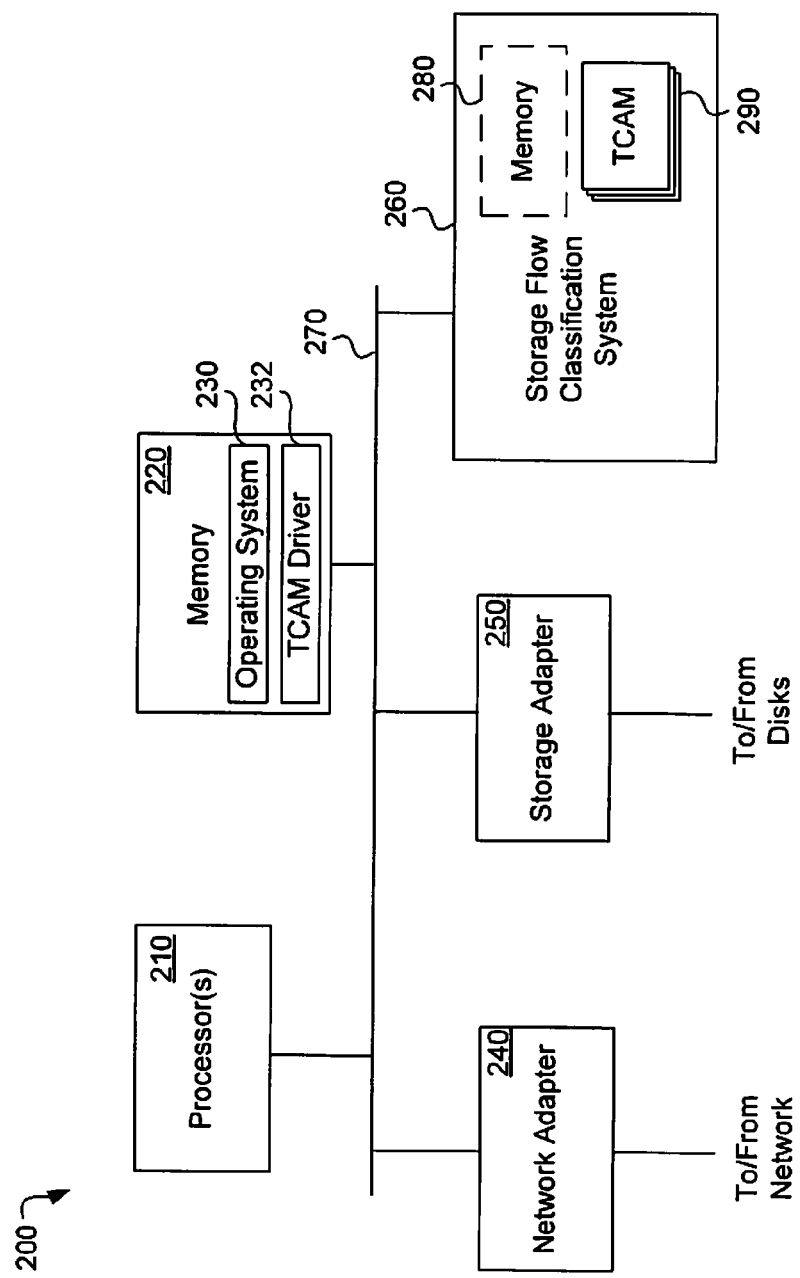
FIG. 2A is a diagram illustrating an example of a storage controller that can implement one or more network storage servers and includes a hardware implemented storage service flow classification system.

FIG. 2A is a diagram illustrating an example of a storage controller that can implement one or more network storage servers 108 and includes a hardware implemented storage service flow classification system. In an illustrative embodiment, the storage controller 200 includes a processor subsystem 210 that includes one or more processors. The storage controller 200 further includes a memory 220, a network adapter 240, a storage adapter 250, and a storage service flow classification system 260, all interconnected by an interconnect 270.

The storage controller 200 can be embodied as a single- or multi-processor storage system executing a storage operating system 230 that preferably implements a high-level module, called a storage manager, to logically organize the information as a hierarchical structure of named directories, files, and special types of files called virtual disks (hereinafter generally "blocks") on the disks 112.

The memory 220 illustratively comprises storage locations that are addressable by the processor(s) 210 and adapters 240 and 250 for storing software program code and data associated with the techniques introduced here. The processor 210 and adapters may, in turn, comprise processing elements and/or logic circuitry configured to execute the software code and manipulate the data structures. The storage operating system 230, portions of which are typically resident in memory and executed by the processing elements, functionally organizes the storage controller 200 by (among other things) invoking storage operations in support of the storage service provided by the storage server 108. It will be apparent to those skilled in the art that other processing and memory implementations, including various computer readable storage media, may be used for storing and executing program instructions pertaining to the technique introduced here.

The network adapter 240 includes a plurality of ports to couple the storage controller 200 with one or more clients 104 over point-to-point links, wide area networks, virtual private networks implemented over a public network (Internet) or a shared local area network. The network adapter 240 thus can include the mechanical, electrical and signaling circuitry needed to connect the storage controller 200 to the network 106. Illustratively, the network 106 can be embodied as an Ethernet network or a Fibre Channel (FC) network. Each client 104 can communicate with the storage server over the network 106 by exchanging information elements according to pre-defined protocols, such as TCP/IP. An information element can be defined as a discrete frame or packet of data.

The storage adapter 250 cooperates with the storage operating system 230 to access information requested by the clients 104. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 112. The storage adapter 250 includes a plurality of ports having input/output (I/O) interface circuitry that couples with the disks over an I/O interconnect arrangement, such as a conventional high-performance, Fibre Channel (FC) link topology.

Storage of information on disks 112 can be implemented as one or more storage volumes that include a collection of physical storage disks cooperating to define an overall logical arrangement of volume block number (VBN) space on the volume(s). The disks 112 can be organized as a RAID group. One or more RAID groups together form an aggregate. An aggregate can contain one or more volumes.

The storage operating system 230 facilitates clients' access to data stored on the disks 112. In certain embodiments, the storage operating system 230 implements a write-anywhere file system that cooperates with one or more virtualization modules to "virtualize" the storage space provided by disks 112. In certain embodiments, a storage manager 310 (FIG. 3) element of the storage operation system 230 logically organizes the information as a hierarchical structure of named directories and files on the disks 112. Each "on-disk" file may be implemented as a set of disk blocks configured to store information. The virtualization module(s) may allow the storage manager 310 to further logically organize information as a hierarchical structure of blocks on the disks that are exported as named logical unit numbers (LUNs).

The storage flow classification system 260, as explained in detail below, in one embodiment includes ternary content addressable memory (TCAM) 290 that facilitates flow classification of storage service requests without consuming resources of the processor 210. The storage flow classification system 260 optionally includes memory 280 to store information used during the classification process, for example, pattern tables. The flow classification allows the storage server 108 to perform actions, for example, reading and/or writing to disk, buffering, load balancing, etc., according to a priority defined in SLA or QoS parameters. While the flow classification system in the example of FIG. 2A is shown using TCAM for the classification process, it should be apparent to one skilled in the art that other forms of content addressable memory can be used according to the techniques introduced here.

Figure 2B:
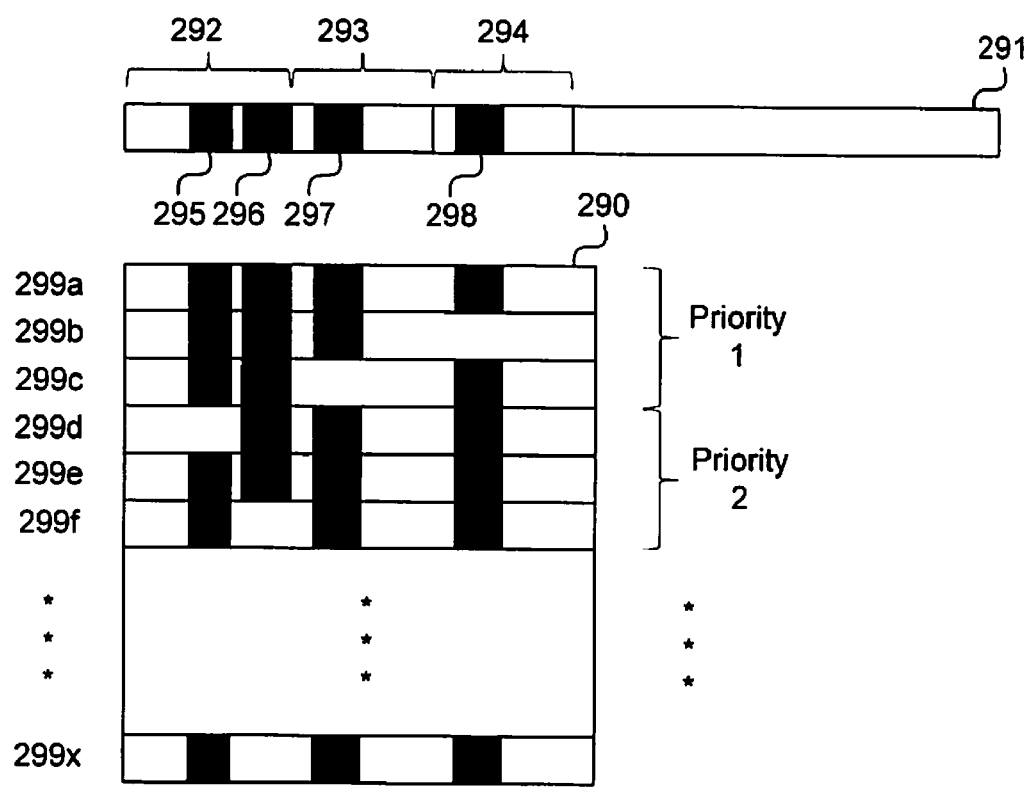
FIG. 2B shows an example of a TCAM layout for storage service flow classification.

FIG. 2B shows an example of a TCAM layout, for example TCAM 290, for storage service flow classification. For ease of description the TCAM width is depicted as being long enough to cover the IP header 292, the TCP header 293, and the RPC header 294 of a packet 291 for a storage service flow.

The packet headers include information such as a source IP address 295, destination IP address 296, a destination port 297, and an RPC program number 298. In the example of FIG. 2B, the filled portions of each filter 299 correspond to elements included in the header of packet 291. For example, filters 299a and 299e both match all of the elements 295-298 of packet 291.

Filters 299, each corresponding to a storage service flow are loaded into the TCAM. As shown, each filter takes up only one row in the TCAM. However, a filter that is longer than the TCAM width may be split between more than one row of the TCAM. The filters in the TCAM are also associated with a priority. For example, filters 299a-299c are priority 1, while filters 299d-299f are priority 2. If there are more filters than can be loaded into the rows of a single TCAM module, multiple TCAM modules can be used to implement the overall flow classification system.

Figure 3:
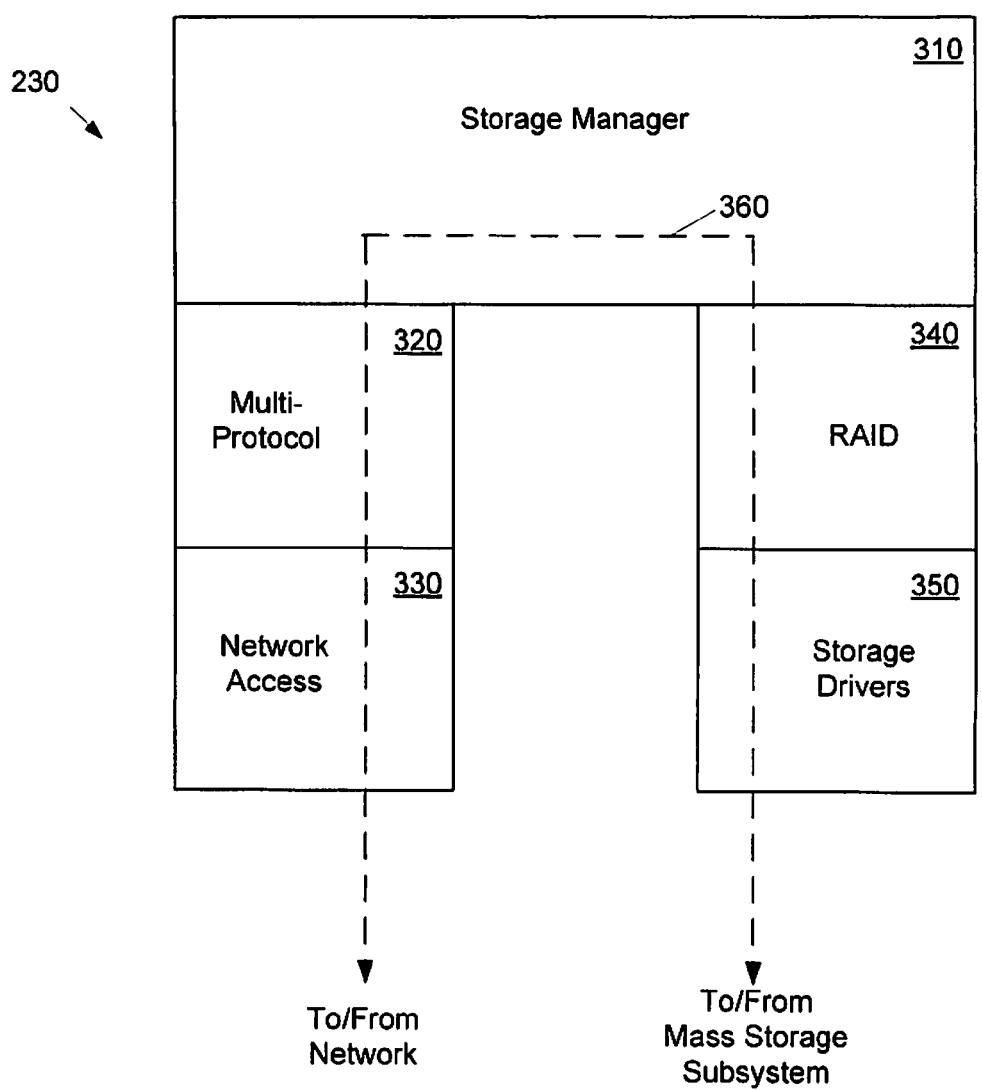
FIG. 3 schematically illustrates an example of the architecture of a storage operating system in a storage server.

FIG. 3 schematically illustrates an example of the architecture of a storage operating system 230 for use in a storage server, such as storage server 108 or 200. The storage operating system 230 can be implemented in programmable circuitry programmed with software and/or firmware, or in specially designed non-programmable circuitry, or in a combination thereof. In the illustrated embodiment, the storage operating system 230 includes several modules, or layers. These layers include a storage manager 310, which is the core functional element of the storage operating system 230. The storage manager 310 imposes a structure (e.g., one or more file systems) on the data managed by the storage server 108 and services read and write requests from clients 104.

To allow the storage server to communicate over the network 106 (e.g., with clients 104), the storage operating system 230 also includes a multi-protocol layer 320 and a network access layer 330, logically under the storage manager 310. The multi-protocol layer 320 implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 330 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also, to allow the device to communicate with a storage subsystem (e.g., storage subsystem 105), the storage operating system 230 includes a storage access layer 340 and an associated storage driver layer 350 logically under the storage manager 310. The storage access layer 340 implements a higher-level storage redundancy algorithm, such as RAID-4, RAID-5 or RAID-DP. The storage driver layer 350 implements a lower-level storage device access protocol, such as Fibre Channel Protocol (FCP) or small computer system interface (SCSI).

Also shown in FIG. 3 is the path 360 of data flow through the storage operating system 230, associated with a read or write operation, from the client interface to the storage interface. Thus, the storage manager 310 accesses the storage subsystem 105 through the storage access layer 340 and the storage driver layer 350.

The storage operating system 230 can have a distributed architecture. For example, the protocol layer 320 and network access layer 330 can be contained in an N-module (e.g., N-blade) while the storage manager 310, storage access layer 340 and storage driver layer 350 are contained in a separate D-module (e.g., D-blade). In such cases, the N-module and D-module (not shown) communicate with each other (and, possibly, with other N- and D-modules) through some form of physical interconnect and collectively form a storage server node. Such a storage server node may be connected with one or more other storage server nodes to form a highly scalable storage server cluster.

Figure 4:
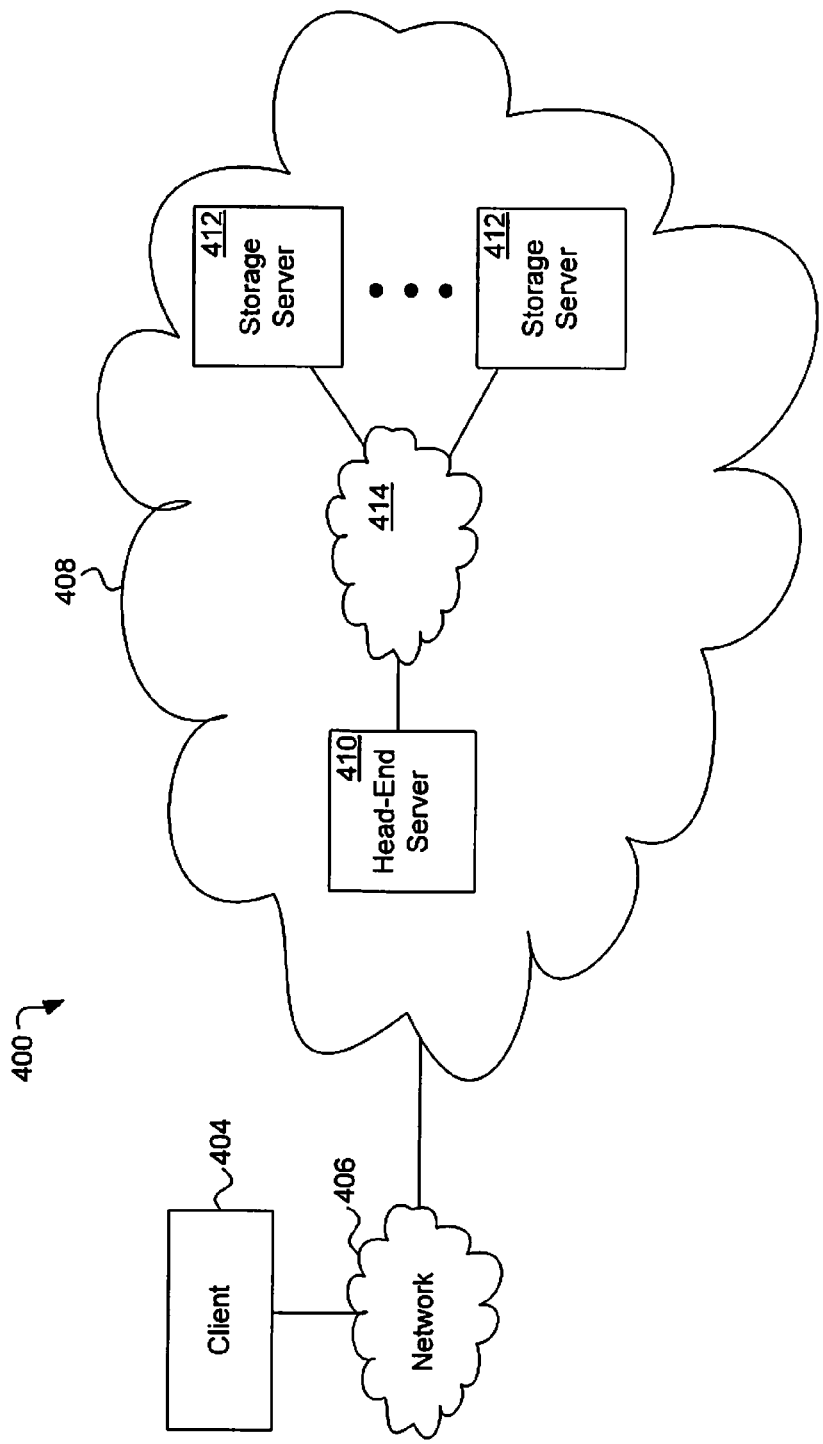
FIG. 4 shows an example of a hardware implemented storage service flow classification system in a cloud storage network.

FIG. 4 shows an example of a hardware implemented storage service flow classification system in a cloud storage network. The system 400 includes a client 404, a communication network 406, and a cloud computing and storage network 408. The client 404 interacts with the cloud storage network 408 through communication network 406. The implementation of the communication network 406 is not germane to this disclosure and can be any suitable network as known to one skilled in the art.

The cloud storage network 408 includes a head-end server 410, an interconnect 414, and a plurality of storage servers 412. Head-end server 410 receives storage service requests and forwards the requests to the corresponding storage servers 412 where the requests will be serviced. The head-end server 410 can further include a hardware implemented storage flow classification system as described above. Packets associated with storage services that pass through the head-end server 410 are classified and can be tagged before being forwarded through the interconnect 414 to storage servers 412. In this embodiment, storage classification is offloaded from the storage server 412 to the head-end server 410 to further free up resources at the storage servers. The storage servers 412 are able to interpret the classification tag and process the request according to SLA or QoS parameters.

In one embodiment, multiple head-end servers 410 can be implemented to enhance scalability. For example, a head-end server in a cloud storage network can be connected to a second head-end server in the cloud storage network for redirecting, load-balancing, mirroring, or peer-clustering purposes. Similarly, a head-end server in one cloud storage network can be connected to a second head-end server in another cloud storage network.

Figure 5:
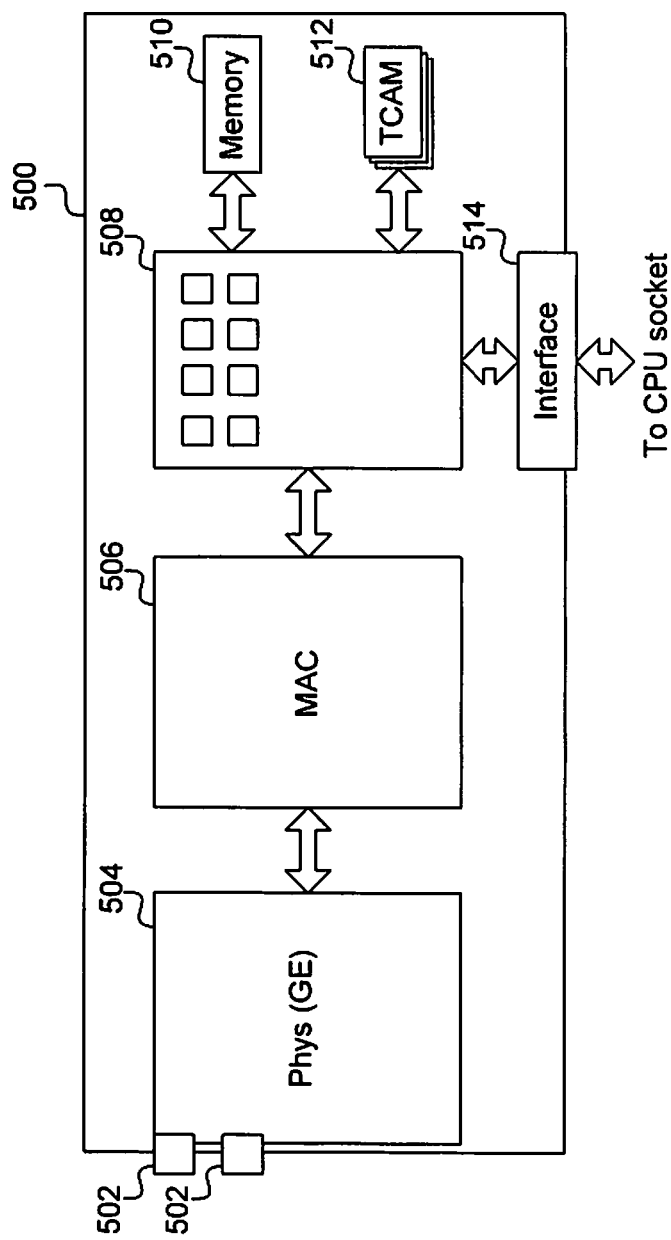
FIG. 5 shows an example of a hardware implemented storage service flow classification system integrated in a network interface card.

While FIG. 2A depicts the storage flow classification system 260 as a discrete component in the storage server, other configurations are possible. For example, FIG. 5 shows an example of a hardware implemented storage service flow classification system integrated in a network interface card 500. The network adapter includes ports 502, a physical controller 504, a MAC controller 506, programmable micro-engines 508, memory 510, TCAMs 512, and interface 514.

In the embodiment depicted in FIG. 5 the storage flow classification is performed on packets received at the network adapter, by using the programmable micro-engines 508, the memory 510, and the TCAM 512. An example of the classification process is described in detail below with reference to FIGS. 6-8. The packets received at the network adapter can be tagged with a classification that can subsequently be interpreted by software or hardware running in the storage server to apply rules and treat the packet according to SLA or QoS parameters.

A hardware based classification system, according to the techniques introduced here, is based on content addressable memory, which in one embodiment, is TCAM. Each cell in TCAM can store a value of 0, 1, or X. An X indicates a wildcard or "don't care" value. For example, a TCAM may have stored in a filter the word 1 XX0. This filter would match any of the following words during a search: 1000, 1010, 1100, and 1110. Having the wildcard value allows for extremely efficient pattern matching which allows for faster flow classification because only some of the bits may be significant for matching a storage service flow. The TCAM driver code 232 can be stored in memory 220 and executed by processor 210 as part of the operating system of storage server 200, for example. Alternatively, the TCAM driver code can be stored in memory 280. In another embodiment, the TCAM driver code is executed by a specialized processor for improved system performance.

The embodiments described above implement a hardware-based storage flow classification system. Providing some level of QoS has been an important feature in networking and telecommunications systems. One example of a QoS model in networking is Differentiated Services (DiffServ). In flow classification generally, a flow can be defined as a unidirectional sequence of packets all sharing a set of attributes. For the DiffServ model, the attributes a flow shares include the source address, destination address, source port, destination port, and the network protocol. Classification based on these attributes is referred to as 5-tuple IP header classification. Once a packet has been classified, actions can then be performed on the packet based on the flow, or classification, of the packet.

The same basic model can be used for storage service flow classification. In addition to using the 5-tuple IP header classification, other attributes, such as storage parameters, can be included in a storage service flow definition to more effectively classify storage service requests. Some additional attributes specific to storage service classification can include, for example, a target storage entity, storage access protocol, storage operation, storage protocol specific tags, and Multipurpose Internet Mail Extensions (MIME) type. Additional attributes will be apparent to one skilled in the art.

Many flow definitions for storage services can be implemented using a rich set of attributes including those mentioned above. The number of flow definitions possible allow for greater control of storage flows and the possibility of many SLA or QoS arrangements to meet the needs of a number of storage service customers. Once a flow for a packet has been determined, an action can be performed on that packet according to an SLA or QoS arrangement. Actions performed on the packet can include, for example, metering, marking/remarking, rate limiting, policing, load balancing, redirecting, mirroring, and encrypting/decrypting.

Figure 6A:
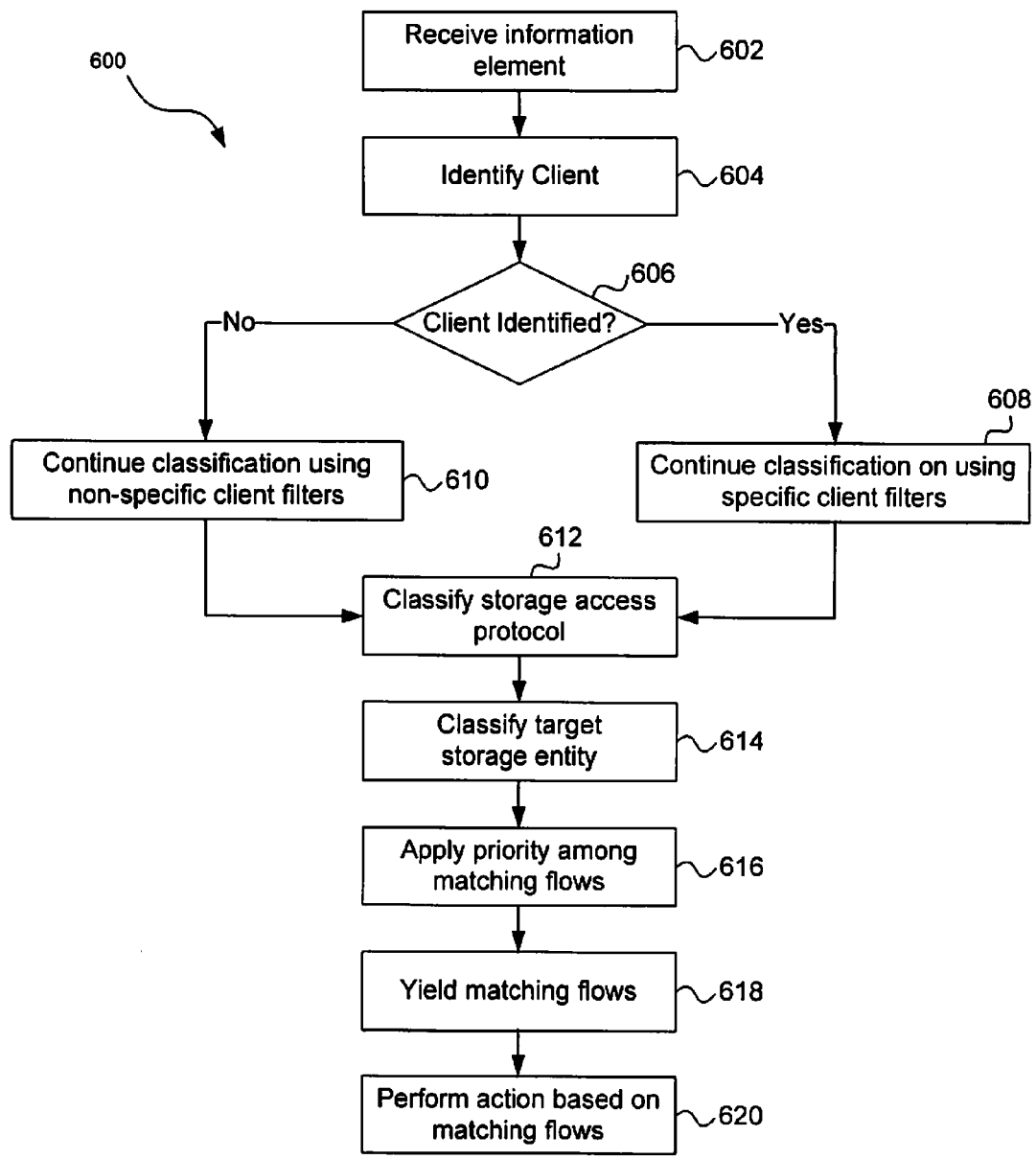
FIG. 6A is a flow diagram of a process for hardware implemented storage service flow classification.

FIG. 6A is a flow diagram of a process for hardware implemented storage service flow classification. The process is organized as a sequence of operations in the flowchart 600. However, it should be understood that at least some of the operations associated with this process can potentially be reordered, supplemented, or substituted for while still performing the same overall technique. Additional attributes can be included in the classification process without departing from the spirit of the techniques introduced here.

The process 600 is hierarchical, where the potential list of matching flow definitions depends on the result of the previous step. Matching flow attributes for each step of the process 600 is performed using content addressable memory, such as, for example, TCAM 290, that is loaded with filter patterns. As described above, multiple TCAMs may be used to perform this process. For example, assume a TCAM has a width of 100 bits and a height of 100 rows. A filter that is 80 bits long can fit on a single row, where a filter that is 150 bits can be split between two rows. If there are more filters than can fit on the 100 rows of the example TCAM then a second TCAM can be used to include the remaining filters. An associated pattern table is used to associate a matched pattern with a possible storage service flow. For example, the IP address X, which corresponds to customer A's storage server, could be included in the associated pattern table along with an indication that storage service requests with a destination of IP address X potentially belong to a flow associated with customer A and therefore can be treated according to customer A's SLA.

The process 600 begins at 602 with the storage server receiving an information element, e.g., a packet, from a client. The process continues at 604 where the client is identified. Multiple clients that access the storage server and request storage services can be associated with a storage service customer. Identifying a particular client machine can lead to identifying a storage service customer. The request can then be treated according to SLA or QoS parameters agreed to by that customer. The client identification process is explained in more detail below with reference to FIG. 6B.

If the client is identified, 606-Yes, then the classification process continues at 608 using a subset of the possible flow definitions that are associated with the particular client that was identified. This step increases the efficiency of the matching process because fewer potential matches have to be searched. If the client is not identified, 606-No, a subset of possible flow definitions that are not associated with any particular client is used for further classification at 610.

At 612, the packet is classified based on the storage access protocol. In one embodiment, this can be accomplished by matching the protocol via the port fields of the TCP/IP header of the information element in a manner similar to matching an IP address using 5-tuple classification. Specific patterns for supported protocols can be computed by software and downloaded to the TCAM. The TCAM driver maintains the order of protocol patterns for a customer. In one embodiment, the TCAM driver initiates a search, performed by the TCAM, for the protocol field value that is the most commonly used protocol for the client. If no match is found, the driver then continues with the next most commonly used protocol until the protocol is finally matched. The most commonly used protocol can be determined by a customer's SLA. For example, in a managed storage service offering such as a cloud service, the storage service provider and clients would agree on storage access protocols as part of the SLA. When only one protocol is agreed upon (such as NFS), then only the patterns for that protocol are downloaded to the TCAM. In this case, the TCAM driver does not need to prioritize the storage access protocols in classification as there is only one. When multiple protocols are agreed upon (such as, for example, CIFS, FTP, NFS, Object, http/webdav, etc), then patterns of all the agreed protocols are downloaded to the TCAM in the order of priority. This process reduces the probability that multiple searches will need to be performed to determine the protocol.

In some cases, basic 5-tuple classification may not be adequate to determine the storage access protocol, for example, when portmapping is employed by network administrators. In a system that uses portmapping, for example, a cloud storage system, a common port is used for many protocols. In the case of storage access protocols such as NFS and CIFS, for example, the specific protocol is identified by a remote procedure call (RPC) identifier. Matching the storage access protocol with RPC identifier requires pattern matching in the application layer payload. Long pattern matching can be used on the upper layer payload of the packet (i.e., layers 4 to 7) to determine the remote procedure call (RPC) program number and from there the protocol can be determined. Well known protocols have standard program numbers. The standard protocol number for NFS, for example, is 100003. Therefore, if pattern matching returns an RPC program number of 100003 then the protocol is likely NFS. The long pattern matching process is described below with reference to FIGS. 7 and 8.

The classification process continues at 614 with classifying the target storage entity. The storage access protocol is relevant to identifying the target storage entity. For example, after the storage access protocol for a packet has been identified, only target storage entities being accessed with that particular protocol are viable matches and the possible flows can again be narrowed to reduce search overhead. Thus, the storage flow classification system may employ a protocol specific algorithm for performing classification. For example, target storage entities that utilize an object based protocol can be classified by uniform resource identifier (URI) matching. Similarly, target storage entities that utilize hypertext transfer protocol (HTTP) can also be classified using URI matching. If the target storage entities are associated with Citrix applications, the target storage entities can be classified by matching Citrix Independent Computing Architecture (ICA) traffic. For a system that utilizes NFS or CIFS protocols, the target storage entities associated with read, write, create, remove, and other operations can be identified by the remote procedure call (RPC) procedure number.

Other target storage entities can be identified by their location in the payload. For example, volume information is contained in a mount request prior to NFS or CIFS operations. Once the mount is successful, a file handle will be given to the client. The client then uses that file handle to identify which volume and file the client is working on. In one embodiment, the TCAM is used to match the mount request and classify the storage service request based on the mount request. The storage server can then perform an action on the NFS or CIFS request on the connection for the mount request according to the SLA.

In some storage access protocols, the packets contain handles to target storage entities rather than using a storage entity ID of the storage entity itself. The handles are known to external clients but the actual internal storage entity ID of the storage entities are known only within the storage server. In one embodiment, the internal storage entity ID is used for generating the bit pattern to be matched in the TCAM. A mapping data structure can be used to translate the external handle to a particular internal storage entity ID for matching. If the pattern for the target storage entity to be matched in the TCAM is longer than the width of the TCAM, long pattern matching can be used.

After the client, storage access protocol, and target storage entity have been identified, in some cases, it is still possible that there are multiple flows that match the identified attributes. To determine which flow to apply, each flow is associated with a priority value. In one embodiment, the priority value can be determined by a network administrator as part of the flow definition. If no priority value is assigned, a default value may be assumed. At 616 the flow with the highest priority value is associated with the packet. If lower priority flows do not conflict with higher priority flows, the lower priority flows can also be associated with the packet. At 618, all possible flows that are not in conflict with higher priority flows are associated with the packet and the storage server 108 then can perform an appropriate action, at 620, according to SLA or QoS parameters.

Figure 6B:
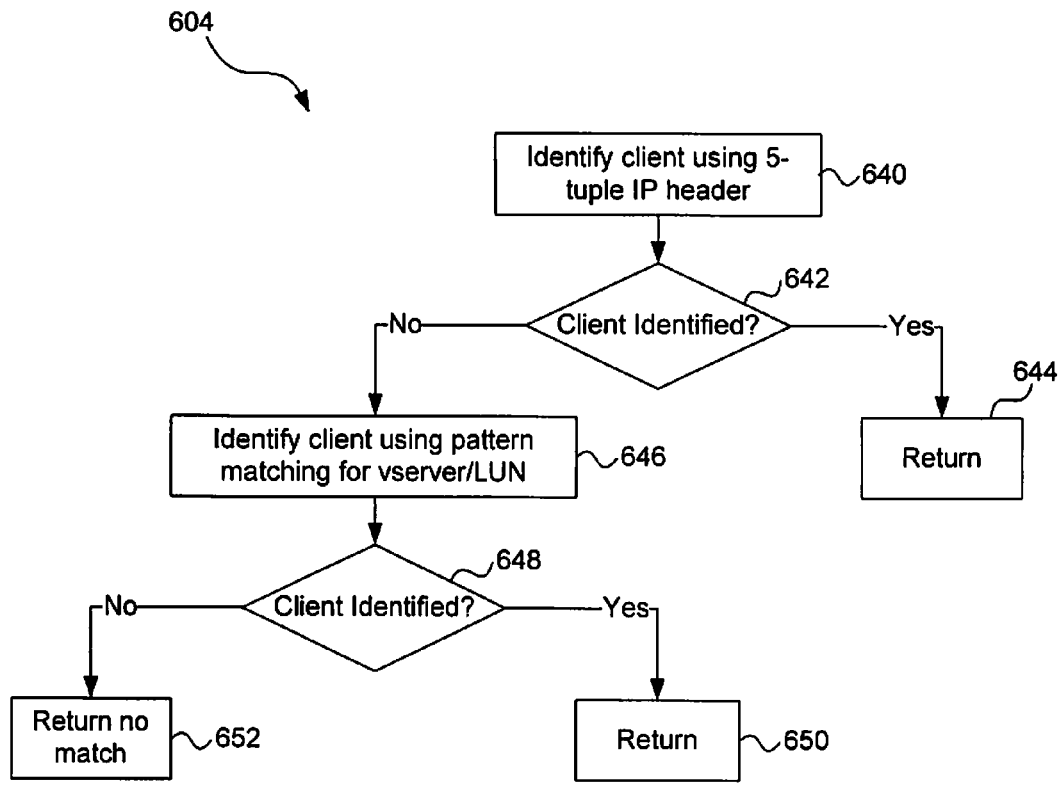
FIG. 6B is a flow diagram of a process for identifying a client during storage service flow classification.

FIG. 6B is a flow diagram of a process 604 for identifying a client during storage service flow classification. The process is organized as a sequence of operations in the flowchart 604. However, it should be understood that at least some of the operations associated with this process can potentially be reordered, supplemented, or substituted for while still performing the same overall technique.

As with the overall classification process, the process 604 identifies the client using the least complex method. If the client can not be identified using the least complex method, only then are more complex methods attempted. This improves the overall efficiency and speed of the process. The process 604 begins with identifying the client using the information included in the IP header of the packet at 640. It can be assumed that in most cases a client can be identified based on the source and/or destination IP address. For example, if each virtual server in a multi-tenancy storage server has its own IP address and only a single client, the client is easily identified by the destination IP address. Other fields in the IP header can similarly be used to identify the client.

In one embodiment, label encoded content addressable memory (LECAM) is used to efficiently identify the client based on the IP header. Using LECAM, decomposition and label encoding are employed to identify the client. In the first stage of LECAM, a collection of parallel search engines, one for each field in the IP header, assigns labels for the matching conditions. Once the search engines resolve the sets of matching of labels for the match conditions on each field, the results are fed to a combiner which returns the set of matching flows in order of priority. In one embodiment the combiner is a CAM specially organized as a two-dimensional array of label cells. LECAM allows using separate search engines for different kinds of fields, for example, tree-based LPM techniques such as Tree Bitmap for IP address matching, Fat Inverted Segment Tree or hash based algorithms for range-match classification (such as ports), and hash table for exact-match classification.

The process continues to 642 where it is determined if a client has been identified. If a client is identified, 642-Yes, the process returns the client at 644, such that additional classification can be performed using possible flow definitions associated with the identified client. If a client is not identified by using the IP header, 642-No, the process continues to 646 where the client is identified using the more complex long pattern matching process on the payload of the packet. For example, the client can be identified by matching a virtual server ("vserver") or logical unit number (LUN) identifiers in the packet. A long pattern can be defined as any pattern that is longer than the width of the TCAM. Other patterns in the payload of a packet can also be used to identify the client. If the client is identified using the long pattern matching process, 648-Yes, the process returns the client at 650, such that additional classification can be performed using possible flow definitions associated with the identified client. However, if the client is not identified, 648-No, the process returns no match at 652 and the additional classification is performed using possible flow definitions that are not specific to a particular client.

Once a client has been identified, as mentioned above, only a subset of the total number of flow definitions, the flow definitions that are associated with that client, need to be used for more complex pattern matching on the L4-7 layers of the packet. Thus, using only a subset of all flow definitions reduces the power consumed by the TCAM because the size of the search space is reduced. Reduction of the search space can be achieved by partitioning the TCAM space into logical blocks and performing the search only on some blocks. Logical partitioning also allows for parallel searching on different blocks. Alternatively, the TCAM can be physically partitioned into segments that are protected from each other.

One approach to long pattern matching is to have a TCAM with a width larger than the longest pattern to be matched. However, for short patterns this is an inefficient use of TCAM space. Another approach is to perform preprocessing to more efficiently perform long pattern matching with a smaller TCAM width.

Figure 7:
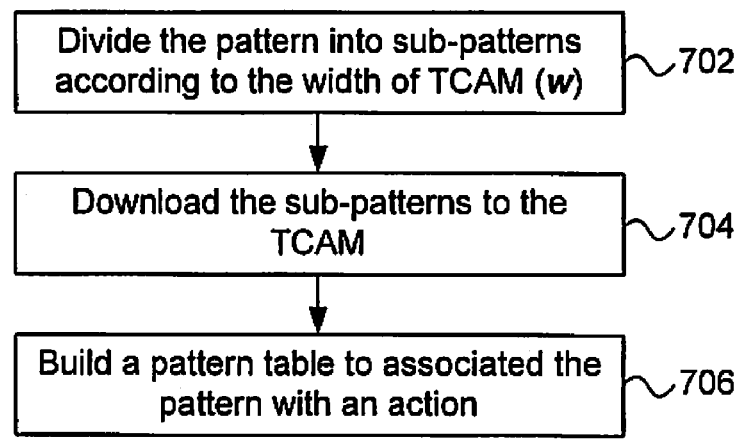
FIG. 7 is a flow diagram of preprocessing for hardware implemented long-pattern matching for storage service flow classification.

FIG. 7 is a flow diagram of preprocessing for hardware implemented long-pattern matching for storage service flow classification. In one embodiment, preprocessing is performed by the TCAM driver. Using the techniques introduced here, the long pattern is divided into sub-patterns according to the width of the TCAM at 702. This approach allows for an optimal TCAM width to be used while still allowing for long pattern matching. If a sub-pattern is shorter than the TCAM width (e.g., the sub-pattern falls at the end of a long pattern) then the sub-pattern can be padded in the front by the tail of the previous sub-pattern. At 704, the sub-patterns are loaded into the TCAM.

At 706, a pattern table is initiated in a memory, for example, memory 280 of the system depicted in FIG. 2A. The pattern table includes a list of all the sub-patterns loaded in the TCAM and where the sub-pattern's position is in the long pattern. As a pattern is matched, the matching pattern is looked up in the pattern table to determine where the matching pattern would be located in the long pattern. If the matched pattern is determined to be in the correct spot in the long pattern, the result is recorded in a partial hit list (PHL). When the next pattern is matched, the matching pattern is compared with the pattern table and it is determined whether the pattern is the subsequent sub-pattern to the one recorded in the PHL. This process is described in detail below with reference to FIG. 8.

Figure 8:
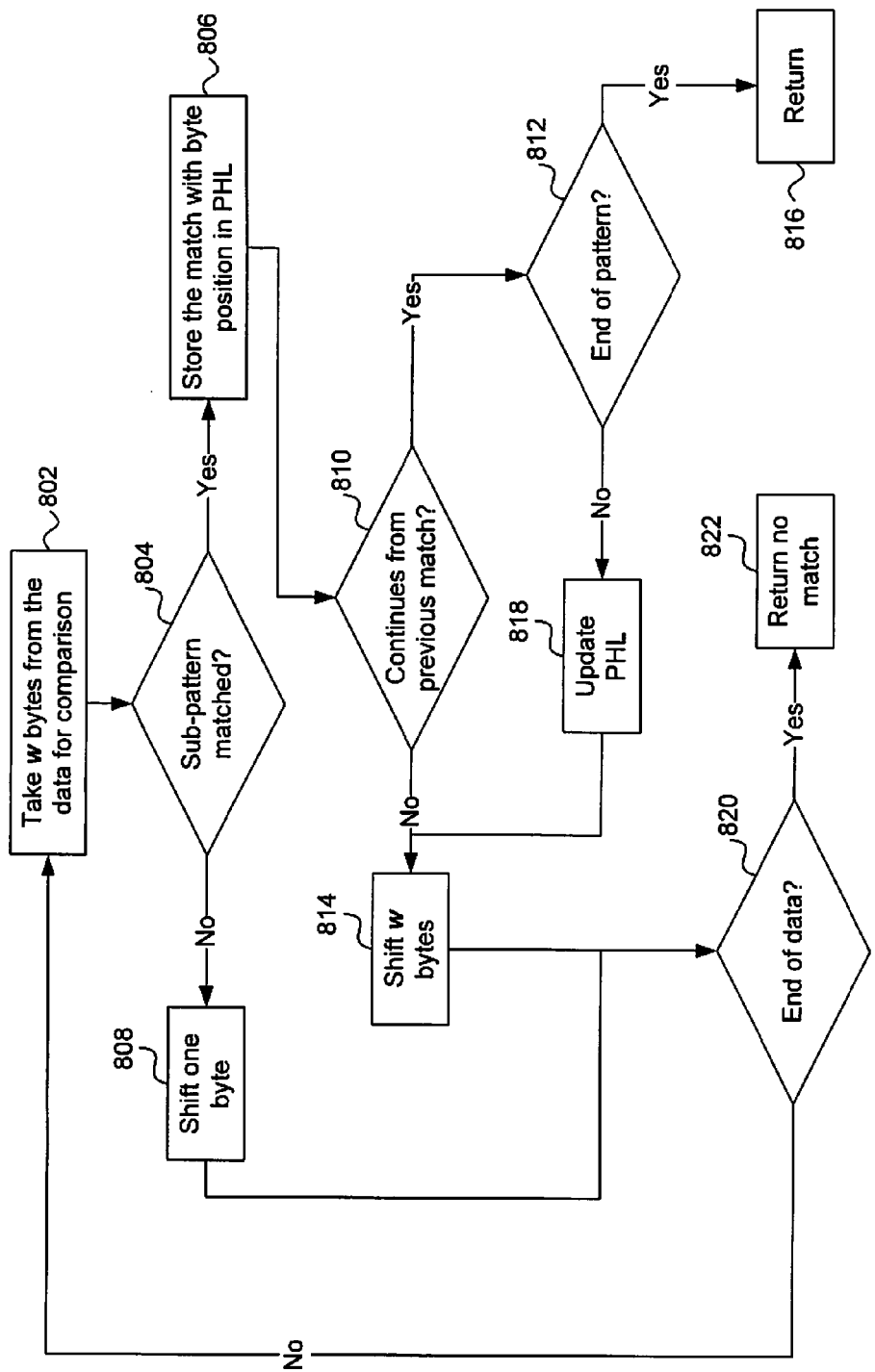
FIG. 8 is a flow diagram of a process for hardware implemented long-pattern matching for storage service flow classification.

FIG. 8 is a flow diagram of a process for hardware implemented long-pattern matching for storage service flow classification. The process begins at 802 with taking the first w byte portion of the data for comparison, where w is the width of the TCAM. For example, if the data includes the bytes "QWERTYUIOP" and the TCAM width is four, the first w byte portion of the data is QWER. At 804, matching is performed using the TCAM to determine whether the portion matches a sub-pattern loaded in the TCAM.

If the portion does not match a sub-pattern stored in the TCAM, 804-No, then the portion being tested is shifted forward by one byte at 808. At 820, it is determined whether the process has reached the end of the data. If the end of the data is reached at this point, 820-Yes, the result is returned to the storage server at 822. However, if the end of the data has not been reached, 820-No, then the process continues to 802 where the next w bytes of the data begin the matching process.

If the portion does match a sub-pattern, 804-Yes, the process continues to 806 where the match is stored in the PHL with an indicator of the byte position of the data portion. Continuing with the above example, in one embodiment, the portion QWER is stored in the PHL with a byte position of 1. Other methods of storing byte position relative to other bytes in the data can be used. At 810, using the byte position, it is determined whether the matched element is a continuation of a previous match. If the match is a continuation, 810-Yes, it is determined if the portion being matched is the end of a long pattern. If the matched portion is the end of a long pattern, 812-Yes, then the long pattern matched is returned for further processing by the storage server.

Continuing with the example above, at 810, the portion QWER is not a continuation of a matched portion because the matched portion is the first portion of the data. In this case, 810-No, the portion being matched is shifted w bytes in the data at 814. The next w bytes of the data in the example are TYUI. At 820, it is determined whether the process has reached the end of the data. If the end of the data is reached at this point, 820-Yes, the result is returned to the storage server at 822. However, if the end of the data has not been reached, 820-No, then the process continues to 802 where the next w bytes of the data begin the matching process.

The example continues with the portion TYUI being matched and stored in the PHL with a byte position of 5, for example. At 810, it is determined that this is a continuation of the previous portion, QWER. At 812, it is determined whether this is the end of a long pattern. In this example the portion is not the end of the long pattern, 812-No, and the PHL is updated to include the matched portion QWERTYUI. The process continues to 814 where the process continues as described above. The continuing process results in the final portion of the long pattern OP being matched and at 816, the result QWERTYUIOP is returned to the storage server as a match.

As can be seen from the above process, long pattern matching is a complex process. In some cases, the complexity is tolerable because the long pattern matching process is done after previous steps, such as matching a client and access protocol, have been performed to narrow the number of possible patterns to be matched.

The techniques introduced above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method comprising:
  receiving an information element at a network storage server, wherein the information element includes a request for storage services on the network storage server and the information element is sent from a client system;
  classifying the information element to a storage flow using information contained in the information element and a hardware-based storage flow classification system that is separate from a processor of the network storage server, the classifying the information element to a storage flow including
    identifying a client based on the information contained in the information element, classifying a storage access protocol for the information element based on the client, and classifying a target storage entity based on the client and the storage access protocol; and performing an action on the information element based on the storage flow.

2. The method of claim 1 wherein the hardware based storage flow classification system includes a content addressable memory (CAM).

3. The method of claim 2 wherein the CAM is a ternary CAM (TCAM).

4. The method of claim 1 wherein the action performed is based on a service level agreement for the client.

5. A method comprising:

receiving an information element at a network storage server;

identifying a client based on information in the information element by using a content-addressable memory (CAM);

identifying a storage access protocol for the information element, based on the client by using a ternary content addressable memory (TCAM);

identifying a target storage entity for the information element, based on the client and the storage access protocol by using the TCAM; and performing an action on the information element based on at least one of the client, the storage access protocol, or the target storage entity and a service level agreement (SLA) for the client.

6. The method of claim 5 wherein the client is identified based on information contained in a network header of the information element.

7. The method of claim 6 wherein when a client cannot be identified based on information contained in a network header, the client is identified using pattern matching on upper layers of the information element.

8. The method of claim 5 wherein the client is determined using label encoded content addressable memory (LECAM).

9. The method of claim 5 wherein identifying a storage access protocol includes using pattern matching on upper layers of the information element.

10. The method of claim 5 wherein identifying using a TCAM includes:

dividing a pattern into one or more sub-patterns according to a width of the TCAM;

loading the one or more sub-patterns into the TCAM;

comparing, in the TCAM, a plurality of portions of an information element payload with the one or more sub-patterns, wherein the plurality of portions of the information element each have a length according to the width of the TCAM;

maintaining a record of sub-pattern matches; and determining from the record of sub-pattern matches a pattern match.

11. The method of claim 5 wherein the TCAM performs a search based on a result of identifying the client.

12. A network storage server comprising:

an interconnect;

a processor coupled with the interconnect;

a storage adapter coupled with the interconnect and configured to provide access to a plurality of storage devices coupled with the storage server;

a network interface coupled with the interconnect and configured to receive an information element containing information from a client system to be stored on at least on of the plurality of storage devices; and a hardware implemented storage flow classification system separate from the processor and configured to classify the information element to a storage flow based on the information contained in the information element, the classifying the information element to a storage flow including identifying a client based on the information contained in the information element, classifying a storage access protocol for the information element based on the client, and classifying a target storage entity based on the client and the storage access protocol.

13. The network storage server of claim 12 wherein the processor is configured to perform an action based on a classification of the information element.

14. The network storage server of claim 12 wherein the network interface includes the hardware implemented storage flow classification system.

15. The network storage server of claim 12 wherein the hardware implemented storage flow classification system includes a content addressable memory (CAM).

16. The network storage server of claim 15 wherein the CAM is a ternary CAM (TCAM).

17. A cloud storage network comprising:

a head-end server configured to forward a request for storage services to a storage server, wherein the head-end server includes a hardware-based storage flow classification system configured to classify the request for storage services based on information contained in the request, the classifying the request for storage services including identifying a client based on the information contained in the request, classifying a storage access protocol for the storage services based on the client, and classifying a target storage entity based on the client and the storage access protocol, and wherein the head-end server is further configured to include a classification tag in the forwarded request; and a storage server configured to receive the request forwarded from the head-end server, interpret the classification tag included by the head-end server, and to perform an action based on the classification tag.

18. The cloud storage network of claim 17 wherein the head-end storage server further includes a network interface and the network interface includes the hardware-based storage flow classification system.

19. The cloud storage network of claim 17 wherein the hardware-based storage flow classification system includes a content addressable memory (CAM).

20. The cloud storage network of claim 19 wherein the CAM is a ternary CAM (TCAM).

* * * * *